United States Patent [19]

Coleman

[11] 4,373,333
[45] Feb. 15, 1983

[54] QUICK TAKE-UP MASTER CYLINDER WITH CHECK VALVE ASSEMBLY

[75] Inventor: John R. Coleman, Dayton, Ohio

[73] Assignee: General Motors Corporation, Detroit, Mich.

[21] Appl. No.: 296,884

[22] Filed: Aug. 27, 1981

[51] Int. Cl.³ .................... B60T 11/08; F16K 15/04
[52] U.S. Cl. ............................... 60/578; 137/539
[58] Field of Search ............ 137/539, 540, 543.17, 137/543.19; 60/578

[56] References Cited

U.S. PATENT DOCUMENTS

| | | | |
|---|---|---|---|
| 1,602,372 | 10/1926 | Bullen | 137/543.19 |
| 2,676,608 | 4/1954 | Svenson | 137/539 |
| 3,002,528 | 10/1961 | Leissner | 137/539 |
| 4,208,881 | 6/1980 | Brademeyer et al. | 137/513.7 |

FOREIGN PATENT DOCUMENTS

| | | | |
|---|---|---|---|
| 364794 | 5/1921 | Fed. Rep. of Germany | 137/543.17 |
| 2338128 | 2/1975 | Fed. Rep. of Germany | 137/543.17 |
| 1347221 | 11/1963 | France | 137/539 |

Primary Examiner—Robert G. Nilson
Attorney, Agent, or Firm—D. D. McGraw

[57] ABSTRACT

A quick take-up valve in a quick take-up master cylinder assembly which reduces fluid flow noise and restriction caused by fluid flowing in one mode of operation through an incipiently or substantially closed valve spring coil stack. The check valve arrangement has a coil compression limiting device and also has the outlet orifice so positioned as not to require fluid flow through the check valve spring coils while the check valve is open.

1 Claim, 2 Drawing Figures

QUICK TAKE-UP MASTER CYLINDER WITH CHECK VALVE ASSEMBLY

A master cylinder embodying the invention utilizes a blow-off valve which permits the buildup of quick take-up pressure to a predetermined point after which the quick take-up chamber is connected to the master cylinder reservoir and the blow-off pressure reduces to substantially, for example to approximately one-half of its original value. This reduces the portion of the master cylinder actuating force required during the remainder of the stroke to force fluid in the quick take-up chamber through the blow-off valve. A similar arrangement is the subject of U.S. Pat. No. 4,208,881, entitled "Quick Take-Up Master Cylinder", issued June 24, 1980, over which the invention herein disclosed and claimed is an improvement.

The quick take-up master cylinder takes up excessive pedal travel by use of a two-stage bore and piston arrangement. It permits the use of increased brake lining clearances, particularly in disc brakes, thus improving gas mileage. It reduces brake pedal effort to manually actuate brakes by using a smaller master cylinder bore diameter for generating high braking pressures after the brake linings have engaged the brake discs or drums. This can remove the requirement of power brake boosters for some cars.

The master cylinder has a stepped bore and a stepped piston defining a large volume chamber and a smaller volume chamber. The large chamber is effective at the beginning of the stroke and in the lower pressure range. It displaces a large volume of fluid at relatively low pressure, which takes up brake lining clearances with a relatively small amount of brake pedal travel. Brake fluid is forced from the large volume or quick take-up chamber around the lip of the primary piston seal into the high pressure chamber as the stroke of the master cylinder piston increases in the brake apply direction. Fluid pressure builds up in the quick take-up chamber to a point that causes the blow-off valve to open and permit passage of substantial quantities of fluid from the quick take-up chamber to the master cylinder reservoir. During the return stroke of the master cylinder piston, excess fluid that has passed from the quick take-up chamber is restored by the flow of fluid from the reservoir around the lip of a compensating seal valve. The blow-off valve is held in the closed position when the master cylinder is in the fully released or at-rest position, and a bypass orifice permits limited passage of brake fluid from the high pressure chamber and the quick take-up chamber into the master cylinder reservoir. Such passage may occur due to temperature changes of the brake fluid or parts of the brake system, for example, providing for delayed pressure equalization.

The check valve assembly embodying the invention prevents undue restriction to fluid flow within the check valve chamber when the check valve constituting the above-described blow-off valve is open. Under some circumstances and in some constructions the check valve coil spring urging the valve closed could be compressed until it becomes a solid stack, unduly restricting fluid flow. In one aspect of the invention a device prevents the coil from being compressed to the extent that flow cannot occur between the spring coils. In another aspect of the invention, a flow orifice is positioned to open into the valve chamber adjacent but radially outward of the spring seat area so that fluid flow occurs predominantly outside the coils of the spring, and need not pass between the coils. This eliminates fluid flow noise which occurs as flow passes between closely positioned spring coils.

IN THE DRAWING

Figure 1:
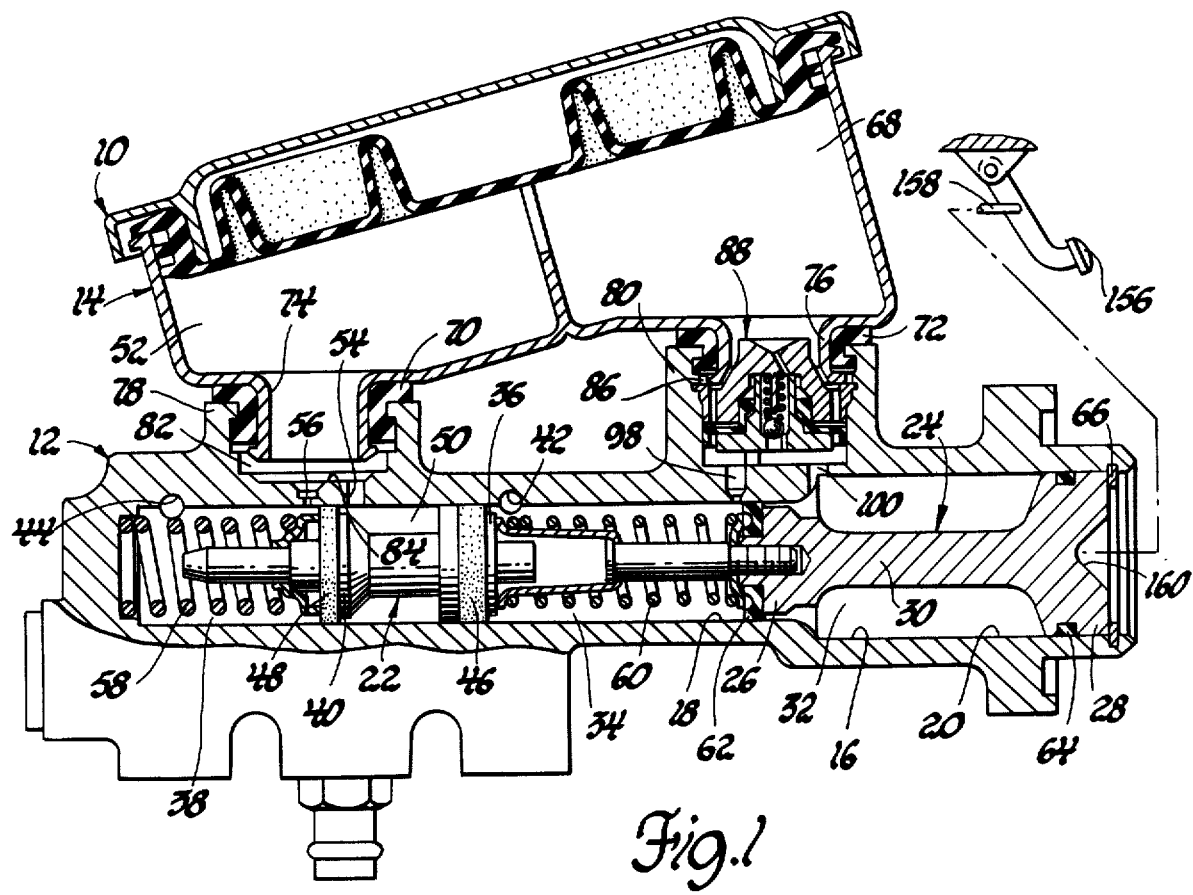
FIG. 1 is a side view of a master cylinder embodying the invention, with parts broken away and in section. The master cylinder is illustrated as being in the fully released position.

The master cylinder assembly 10 includes a housing 12 and a reservoir body 14. The housing has a stepped bore 16 formed therein with a smaller diameter forward section 18 and a larger diameter rear section 20. Since the master cylinder is shown as being of the dual circuit type, it is provided with two pressurizing pistons. The forward piston 22 is the secondary piston and is reciprocably received in the forward portion of bore section 18. The rear piston 24 is the primary piston and is a stepped piston. It has a forward piston head 26 formed as a piston land and reciprocably received in the rear portion of bore section 18. It has a rear piston head 28 formed as a land and reciprocably received in bore section 20. The piston heads 26 and 28 are joined by a reduced diameter section 30.

Piston 24 cooperates with bore 16 to define a high volume or quick take-up chamber 32 between piston heads 26 and 28. A high pressure pressurizing chamber 34 is defined by the rear part of bore section 18, piston head 26, and the rear end 36 of secondary piston 22. Another high pressure pressurizing chamber 38 is defined by the forward end 40 of secondary piston 22 and the forward end of bore section 18. An outlet 42 is provided in housing 12 to deliver brake fluid pressurized in chamber 34 to one brake circuit, and an outlet 44 is provided in housing 12 to deliver brake fluid from pressurizing chamber 38 to another brake circuit. Piston 22 has cup seals 46 and 48 respectively mounted on piston ends 36 and 40 in the usual manner. Cup seal 46 will prevent flow from chamber 34 past secondary piston end 36. Cup seal 48 will prevent fluid flow from pressurizing chamber 38 past piston end 40. The chamber 50 between the piston ends 36 and 40 is a compensation chamber which is continually connected to the brake fluid reservoir chamber 52 through compensation port 54. A compensation port 56 provides communication between pressurizing chamber 38 and reservoir chamber 52 when the secondary piston is in the fully released position shown in FIG. 1 so that cup seal 48 uncovers port 56. A piston return spring 58 is provided in chamber 38 and continually urges secondary piston 22 toward the released position. A piston return spring 60 in chamber 34 continually urges piston 24 toward the released position. Spring 60 is a caged spring, as is well-known in the art, which when extended to its permissible limit also establishes the release position of secondary piston 22.

A cup seal 62 is mounted on the forward side of piston head 26 of primary piston 24. Seal 62 is arranged to prevent fluid flow from pressurizing chamber 34 to quick take-up chamber 32, while acting as a check valve which permits fluid flow from chamber 32 to chamber 34 around the outer periphery of piston head 26 and the lip of cup seal 62 while pressure in chamber 32 is greater than pressure in chamber 34. A seal 64 is mounted on piston head 28 to seal the rear end of chamber 32. A piston stop 66 is provided in the open end of the enlarged bore section 20 and forms an abutment engaged by piston head 28 when the master cylinder is in the fully released position.

The reservoir body 14, in addition to fluid chamber 52 for the forward pressurizing chamber 38, has a fluid chamber 68 for the pressurizing chambers 32 and 34. The reservoir body is secured to the master cylinder housing by use of annular retaining and sealing means 70 and 72 which cooperate with short mounting tubes 74 and 76 formed as a part of reservoir body 14. The retaining and sealing means 70 and 72 and the mounting tubes 74 and 76 are respectively received in annular bosses 78 and 80 formed as a part of housing 12. Boss 78 has a recess 82 opening upwardly to receive retaining and sealing means 70 and mounting tube 74 and in open communication with chamber 52. Compensation ports 54 and 56 open through the bottom surface 84 of recess 82, as well as the side wall of bore section 18.

Figure 2:
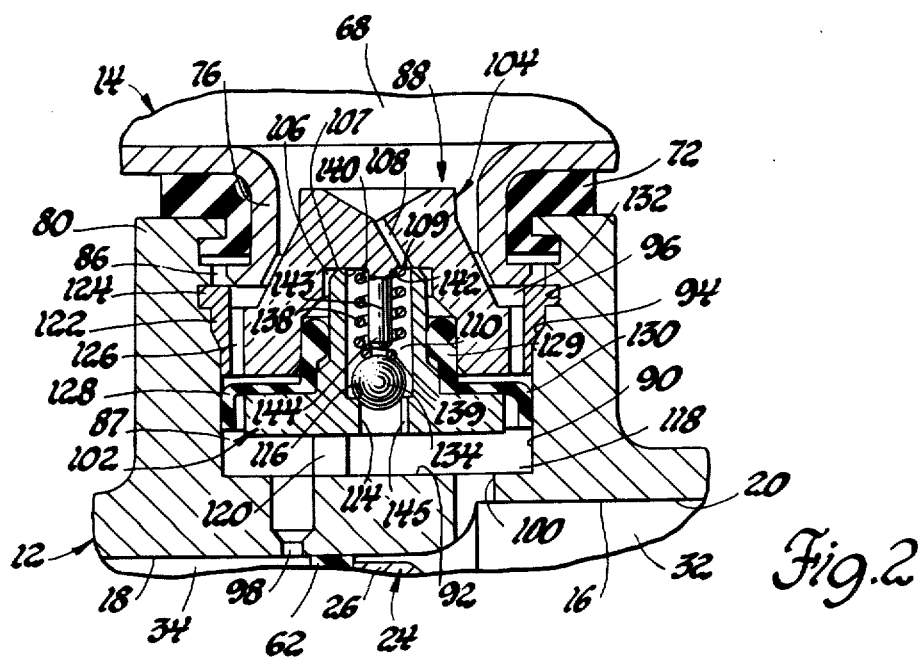
FIG. 2 is an enlarged view of the compensation control and blow-off unit of the master cylinder of FIG. 1, with parts broken away and in section.

Boss 80 has a recess 86 which similarly receives retaining and sealing means 72 and mounting tube 76. The lower portion of recess 86 is also a valve unit chamber 87 receiving the compensation control and blow-off valve unit 88. This portion of the master cylinder assembly is in greater detail in FIG. 2. The lower portion of recess 86 forming the valve unit chamber 87 has a side wall 90, a bottom surface 92, a beveled annular shoulder 94 and an annular groove 96 adjacent and above shoulder 94. Compensation port 98 is formed through bottom surface 92 and opens into the rear end of bore section 18. It is so positioned relative to the fully released position of cup seal 62 that it opens into pressurizing chamber 34, but is closed during the initial brake apply movement of piston 24 by the lip of cup seal 62. Compensation port 100 extends through bottom surface 92 and into the larger diameter quick take-up chamber 32.

Unit 88 includes a valve seat member 102 and a valve body 104. A recess 106 is formed axially within body 104 and opens toward the lower portion of recess 86. The portion of valve body 88 defining the upper end 107 of recess 106 has a restrictive flow orifice 108 formed therethrough and connecting reservoir chamber 68 with recess upper end 107. The orifice end 109 which opens into recess 106 is offset from the axis of that recess for purposes set forth below in detail. The upper portion of recess 106 receives the upper part of valve seat member 102, which defines a valve chamber 110. The lower portion of valve chamber 110 defines a passage 114 extending through the lower side of member 102 with the upper end of the passage shaped to provide a valve seat 116. The lower end of passage 114 opens into a lower chamber 118 defined by recessed bottom surface 92, the lower portion of recessed side wall 90, and the undersurface of valve seat member 102. The valve seat member may be provided with one or more castellated supports 120 to maintain chamber 118. A flange 122 around the center part of valve body 104 is beveled to mate with shoulder 94 to axially and radially locate the valve body in the lower portion of recess 86. Retainer 124 fits in groove 96 and over flange 122 to hold the valve body in position against axial movement. A series of circumferentially spaced passages 126 are formed to extend axially through flange 122 and generally axially parallel to the axis of recess 106. A cup seal 128 is peripherally mounted on the lower portion of valve seat member 102, which is smaller in diameter than the diameter of side wall 90, and has a portion 129 sealingly fitting between member 102 and body 104 to close the outer annular portion of the lower end of passage 106. Seal 128 has a lip 130 which is sealingly engageable with recess side wall 90. Passages 126 connect the top portion 132 of the valve unit chamber of recess 86 with the upper side of cup seal 128 so that fluid may flow from chamber 68 through passages 126 and past cup seal lip 130 into chamber 118. Thus the cup seal acts as a valve permitting such flow while preventing flow in the reverse direction, and is a lip type compensating seal.

A ball type check valve 134 is positioned for axial movement in valve chamber 110 of valve seat member 102. The valve 134 is engageable with valve seat 116 to close the lower end of chamber 110 and therefore the inner portion of the lower end of recess 106. A spring 138 provides yieldable means urging valve 134 toward valve seat 116. One end 139 of spring 138 seats on the upper side of valve 134 and the other end 140 of spring 138 seats on a spring seat surface 142 provided by the upper end 107 of chamber 110 and radially inward of orifice end 109 so as not to interfere with orifice 108. The upper end of valve seat member 102 which engages chamber end 107 is positioned radially outward of orifice end 109 so that orifice 108 is more particularly connected with valve chamber 110. This arrangement permits flow between reservoir chamber 68 and lower chamber 118, primarily under control of valve 134, without requiring the flowing fluid to pass between the coils of spring 138. This reduces the possibility of an undue fluid flow restriction because of the coils of spring 138. As a further assurance against such undue fluid flow, a device 143 for limiting the opening movement of ball check valve 134 is provided. Device 143 is illustrated as a pin formed as a part of valve body 88 and extending axially downward within the upper part of recess 106 so that its end 144 terminates in axially spaced relation from ball check valve 134 when that valve is seated on valve seat 116. Upon a predetermined amount of ball check valve opening movement, the end 144 is engaged by the ball check valve 134 to prevent sufficient compression of coil spring 138 to cause the coils thereof to become a solid stack, so that fluid flowing around valve 134 can, when needed, flow through the open coils of spring 138 as it flows within the valve chamber 110 without restriction caused by a solid stack of the coils of the spring. While it is preferred that orifice end 109 be offset as above described, thereby minimizing any need for fluid flow through the spring coils, some constructions may require the orifice end 109 to open radially within the spring end 140. With this arrangement it would be very advantageous to prevent the coils from stacking.

A restrictive flow orifice 145 is formed in member 102 in parallel with valve 134 and its seat 116, maintaining limited continuous fluid communication between valve chamber 110 above valve seat 116 and chamber 118 below the valve seat. Orifice 145 is illustrated as a groove in the side wall of passage 114, opening through a part of valve seat 116 so that it is open even when ball check valve 134 is seated on seat 116. Thus the valve and valve seat are restrictively bypassed, the orifice 145 providing a controlled leak accommodating a delayed pressure equalization under a static pressure condition. Restrictive flow orifice or passage 145 provides a greater restriction to fluid flow than does orifice 108.

The master cylinder assembly 10 is arranged to be actuated by a vehicle operator through a brake pedal 156 and a push rod 158 which engages the rear end 160 of primary piston 24. Upon initial brake applying movement of piston 24, the volume of quick take-up chamber 32 decreases and fluid is pushed past cup seal 62 into chamber 34. The cup seal 62 moves to close off compensation port 98 so that pressurization can be obtained in chamber 34. Since check valve 134 is seated on seat 116, fluid flow between quick take-up chamber 32 and reservoir chamber 68 through passage 114 is prevented, and only a very small flow passes through orifice 145. Thus pressurization of the fluid in chamber 32 can occur in a substantially undiminished manner. Fluid is being displaced from chamber 32 at a relatively large volume but low pressure. It flows past cup seal 62, into chamber 34, and through outlet 42 to the brake circuit connected to that outlet. The pressure also acts on the rear end 36 of secondary piston 22 to move that piston forwardly so that its cup seal 48 closes compensation port 56 and fluid pressurization begins in chamber 38. Fluid so pressurized goes through outlet 44 to the brake circuit connected with that outlet. In a brake system where disc brakes are used on the front vehicle wheels only, the disc brake actuating circuit would be connected to outlet 42, thus taking advantage of the high volume of fluid being delivered through that outlet to provide for quick take-up of the brake linings so that they move quickly to engage the brake discs.

The pressure in chamber 32 acts on the lower surface of valve 134 across the effective area of seat 116 while the upper side of the valve is exposed to reservoir pressure, which is usually substantially atmospheric pressure. As the pressure in chamber 32 increases, it reaches a point where the pressure differential acting on valve 134 overcomes the spring closing force of spring 138, moving the valve upwardly. This communicates the quick take-up chamber 32 with reservoir chamber 68 through passages 114, valve chamber 110, and restrictive flow orifice 108. Once the valve moves upwardly so that it disengages from its valve seat 116, the pressure from chamber 32 acts on a greater portion of the lower surface of valve 134 thereby permitting a reduction in pressure in the quick take-up chamber 32 without permitting closure of valve 134. By proportioning the area of the valve exposed to quick take-up pressure when the valve is closed relative to the total valve lower surface area, quick take-up pressure is permitted to drop substantially, for example to approximately one-half of its blow-off pressure value, thereby substantially reducing the amount of brake pedal effort required to displace fluid from chamber 32 as the master cylinder is further actuated in the brake apply mode. Further master cylinder actuation causes pressures to be generated in chambers 34 and 38 at a high rate relative to the amount of stroke since the brake circuits no longer require any appreciable additional fluid volume. The pressurization then depends primarily on the brake pedal force exerted without requiring much brake pedal travel.

Upon brake release, pistons 22 and 24 move rightwardly as seen in FIG. 1. Any required compensating fluid for chamber 38 will flow through port 54 from reservoir chamber 52 to chamber 50 and past cup seal 48. At the same time, fluid is flowing from the brake circuit through outlet 44 into chamber 38. Fluid required for compensation of pressurizing chamber 34 will flow from reservoir chamber 68 through valve chamber top portion 132, passages 126, past lip 130 of cup seal 128, and through lower chamber 118 to compensation port 98. The fluid will then flow past cup seal 62 into chamber 34. Compensation fluid from the reservoir entering lower chamber 118 will also flow through compensation port 100 to quick take-up chamber 32. This chamber requires a relatively large amount of compensating fluid since the volume of chamber 32 increases rapidly upon brake release. The passages and chambers provided are sufficient for this purpose.

As the master cylinder reaches its fully released position, secondary piston cup seal 48 will open compensation port 56 so that pressurizing chamber 38 is directly connected through that port to reservoir chamber 52. Cup seal 62 will open compensation port 98 so that pressurizing chamber 34 is directly connected to lower chamber 118. Any temperature changes requiring fluid compensation after the brakes have been released are readily permitted since both pressurizing chambers 34 and 38 have open lines of fluid communication with the reservoir chambers of the reservoir body through orifice 145.

Under some conditions of operation, the vehicle operator may jam the brake pedal 156 in an attempt to obtain a very hard brake apply. Under such circumstances, the pressure increase in quick take-up chamber 32 may be such that the blow-off pressure is reached before sufficient volume can be pushed past cup seal 62 to the brake circuit served by chamber 34 and outlet 42. This causes the blow-off valve 134 to open and permit fluid flow from chamber 32 to reservoir chamber 68. To minimize the loss of fluid volume in this manner, restrictive flow orifice 108 is provided in series with the blow-off valve 134, restricting the amount of fluid flow that would otherwise occur and providing constant brake pedal travel irrespective of the rate of brake pedal apply.

The embodiments of the invention in which an exclusive property or privilege is claimed are defined as follows:

1. In a quick take-up master cylinder having a reservoir, first and second pressurizing chambers respectively provided with first and second pistons for pressurizing brake fluid therein, said first pressurizing chamber being a low pressure high volume displacing chamber and said second pressurizing chamber being a high pressure low volume displacing chamber, a compensation control and blow-off valve unit wherein the blow-off valve thereof is a check valve assembly having a valve body, a valve chamber formed in said body and defined by spaced end walls and a side wall, an inlet port in continuous fluid communication with said first pressurizing chamber and opening through one of said end walls into said valve chamber to define a valve seat therein, a ball check valve in said valve chamber normally seated on said valve seat, a compression coil spring in said valve chamber having one spring end seated on the other of said end walls and the other spring end engaging said ball check valve, said coil spring urging said ball check valve toward said valve seat, and an outlet port in said valve body providing continuous communication from said valve chamber to said fluid reservoir, said first piston when moved in the actuating direction generating a quick take-up pressure in said first pressurizing chamber initially transmitted to said second pressurizing chamber and at a predetermined pressure opening said ball check valve and thereafter desirably causing a high fluid flow at a predetermined low noise level through said input port and said outlet port to said reservoir;

means for reducing fluid flow noise and fluid flow restriction within said valve chamber when fluid pressure from said first pressurizing chamber opens said ball check valve by compressing said coil spring to allow the desired fluid flow from said inlet port through said valve chamber and said outlet port, said means including a ball check valve opening movement limiting device extending from said check valve chamber other end wall into said coil spring and in alignment with said ball check valve but spaced from said ball check valve when said ball check valve is seated on said valve seat, and engaged by said ball check valve upon a predetermined limited amount of ball check valve opening movement to prevent sufficient compression of said coil spring which would otherwise cause the coils thereof to incipiently become a solid stack and generate a fluid flow noise exceeding said predetermined low noise level because of the proximity of the coils to each other, and further so that the desired fluid flow can flow through the coils of said spring within said valve chamber due to the reduction in fluid flow restriction;

said outlet port being offset from the axis of said limiting device and said coil spring so that the end of the outlet port at said valve chamber is positioned radially outside the spring seating portion of said other end wall, thereby to further reduce fluid flow restriction by providing a fluid flow path from said inlet to said outlet outside said coil spring.

* * * * *